United States Patent
Paulsen et al.

(10) Patent No.: US 6,881,389 B2
(45) Date of Patent: Apr. 19, 2005

(54) REMOVAL OF $H_2S$ AND $CO_2$ FROM A HYDROCARBON FLUID STREAM

(75) Inventors: Dwight C. Paulsen, Slidell, LA (US); Leon G. Barnett, Metarie, LA (US); Wayne C. Page, Ruston, LA (US)

(73) Assignee: EDG, Inc., Metairie, LA (US)

(*) Notice: Subject to any disclaimer, the term of this patent is extended or adjusted under 35 U.S.C. 154(b) by 177 days.

(21) Appl. No.: 10/253,123

(22) Filed: Sep. 24, 2002

(65) Prior Publication Data

US 2004/0057886 A1 Mar. 25, 2004

(51) Int. Cl.$^7$ .............................................. B01D 47/00
(52) U.S. Cl. ...................... 423/210; 423/212; 423/220; 423/243.01; 423/243.08
(58) Field of Search ................................ 423/212, 210, 423/220, 243.01, 243.08, 242.1

(56) References Cited

U.S. PATENT DOCUMENTS

| | | | |
|---|---|---|---|
| 3,855,332 A | 12/1974 | Wang | |
| 3,970,740 A | 7/1976 | Reeder et al. | |
| 4,010,010 A | 3/1977 | Ward | |
| 4,235,607 A | 11/1980 | Kinder et al. | |
| 4,239,510 A | 12/1980 | Hays et al. | |
| 4,322,227 A | 3/1982 | Cook et al. | |
| 4,563,202 A | 1/1986 | Yao et al. | |
| 4,603,035 A | 7/1986 | Connel et al. | |
| 4,804,523 A | 2/1989 | Abrams et al. | |
| 5,340,382 A | 8/1994 | Beard | |
| 5,364,611 A | 11/1994 | Iijima et al. | |
| 5,395,461 A | 3/1995 | Taki et al. | |
| 5,397,553 A | 3/1995 | Spencer | |
| 5,562,891 A | 10/1996 | Spencer et al. | |
| 5,700,311 A | 12/1997 | Spencer | |
| 6,017,501 A | 1/2000 | Waycuilis | |
| 6,028,234 A | 2/2000 | Heinemann et al. | |
| 6,111,155 A | 8/2000 | Williams et al. | |
| 6,280,505 B1 | 8/2001 | Torkildsen et al. | |
| 6,284,023 B1 | 9/2001 | Torkildsen et al. | |

*Primary Examiner*—Stanley S. Silverman
*Assistant Examiner*—Edward M. Johnson
(74) *Attorney, Agent, or Firm*—Joseph T. Regard Ltd PLC

(57) ABSTRACT

A system for removal of Hydrogen Sulfide ($H_2S$) and/or Carbon Dioxide ($CO_2$) from natural gas via absorption and disassociation utilizing a sea water contact system. In the preferred embodiment of the present invention, a series of counter current scrubber stages is provided, each configured to remove via absorption/disassociation a portion of the impurities, each stage having less pressure than the predecessor, each stage redirecting the purified gas to the preceding stage, until the contaminant level in the hydrocarbon gas stream has been reduced to an acceptable level. The hydrogen sulfide/carbon dioxide contaminants are thereby sequestered in the sea water utilized in the scrubber, which sea water may be further processed and/or re-introduced into the deep of a body of water, where the contaminants will remain isolated for hundreds of years. The present invention further contemplates and energy recovery system for greatly enhancing the efficiency of the system. Accordingly, the present invention provides an efficient and cost effective method for the purification of natural gas on an offshore platform.

22 Claims, 1 Drawing Sheet

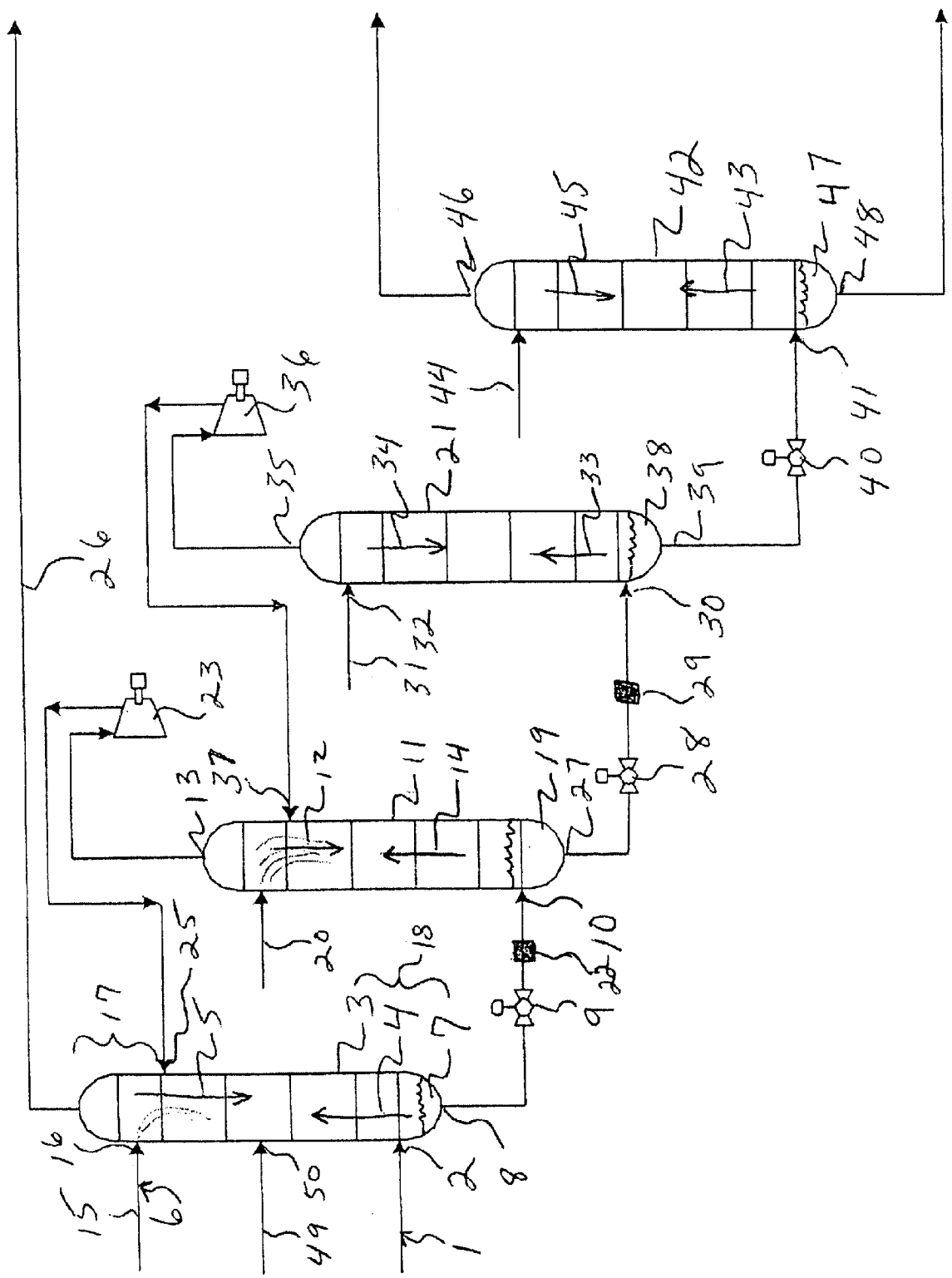

US 6,881,389 B2

REMOVAL OF H₂S AND CO₂ FROM A HYDROCARBON FLUID STREAM

FIELD OF THE INVENTION

The present invention relates to systems for the isolation and removal of impurities in hydrocarbon fluid streams, and in particular to a system for removal of Hydrogen Sulfide ($H_2S$) and/or Carbon Dioxide ($CO_2$) from natural gas via absorption and disassociation utilizing, at least one sea water contact apparatus.

In the preferred embodiment of the present invention, a series of counter-current multistage scrubbers are provided, each configured to remove via absorption/disassociation a portion of the impurities, each stage having less pressure than the predecessor, each stage redirecting the purified gas to the preceding stage, until the contaminant level in the hydrocarbon fluid stream has been reduced to an acceptable level.

The hydrogen sulfide/carbon dioxide contaminants are thereby sequestered in the utilized sea water, which sea water may be further processed and/or reintroduced at shallow depths or into the deep of a body of water, where the contaminants will remain isolated for hundreds of years. Accordingly, the present invention provides an efficient and cost effective method for the purification of natural gas on an offshore platform and a convenient, environmentally safe disposition of the contaminants removed.

GENERAL BACKGROUND DISCUSSION OF THE INVENTION

The two most common impurities in natural gas are hydrogen sulfide and carbon dioxide, called acid gases. In order to make the contaminated gas suitable for use and sales requires removal of the hydrogen sulfide ($H_2S$), and often partial removal of the carbon dioxide ($CO_2$) component.

Some of the known processes for purifying natural gas utilized offshore are amine absorption and regeneration, solid absorbents, liquid scavengers, and catalytic oxidation. The amine and solvent-based systems have large heats of regeneration, large energy requirements, large cooling loads, and fresh water make-up. Solid absorbents are only applicable to $H_2S$ removal and create material handling problems, both with the loading, unloading, and disposal of the spent solid activities that are particularly difficult, hazardous and time consuming on an offshore platform.

The amine sweetening system produces a waste gas stream consisting principally of hydrogen sulfide gas. The gas can be flared but produces sulfurous acid, a corrosive and toxic air pollutant, regulated under the Clean Air Act. Accordingly, it is an object of this invention to provide a method which enables a more economical and convenient means of treating the natural gas.

An example of where removal of $H_2S$ and $CO_2$ from a gas stream is necessary can be found during the production of natural gas on an offshore production platform. The $H_2S$ must be removed for a number of reasons. First of all it is lethal, and at low concentrations it has a very disagreeable odor. It promotes the formation of hydrates in the downstream systems and causes sulfide stress cracking of carbon steel. On the other hand, $CO_2$ in natural gas is objectionable because it is an inert and reduces the heating value. $H_2S$ and $CO_2$ are commonly referred to as acid gases. In the U.S., the $H_2S$ content of natural gas is nearly always limited to 0.25 gr/100 scf (4 ppmv) and specifications can be as low as 1 ppmv in some countries. The $CO_2$ content is often limited to 2.0 vol % in the U.S.

A variety of processes have been developed for removing acid gases from natural gas. Only a select few have been applied to offshore gas production. In general, the most common processes include selective absorption by solid absorbents, reaction and physical solution by selective solvents, reaction with specific chemical agents, and so forth. The selection of the process depends on the volumes of gas to be treated, and the acid gas concentrations.

Although a few processes have proved successful for acid gas removal in offshore applications, they are usually energy intensive, operationally complex, requiring large, expensive equipment, continual operational attention, and need an additional process step to convert the $H_2S$ to sulfur. This step is usually referred to as a sulfur removal unit (SRU).

One typical solvent adsorption process is amine sweetening, utilizing ethanolamine solvent such as MEA, MDEA and DEA. The solvent is circulated to the gas contactor, where it removes the $H_2S$, then to the condensate separator, the rich/lean amine exchanger, and is regenerated in the stripper/reboiler section. Heat is required, usually by way of a gas-fired boiler to regenerate the amine, creating a potential fire hazard on an offshore platform that has limited space to separate process equipment. The reboiler feeds the stripper column that also requires an air or water-cooled condenser to condense the amine to minimize losses. The regenerated amine, still hot from the stripping process, must be cooled before being pumped and returned to the contactor. Typical energy requirements are 20–40 MMBtu/hour, plus 500–1000 horsepower to drive the pumps and coolers.

In addition, there is a requirement of fresh make-up water. These systems cost from $10–20 million and occupy a large area of the platform. The system must be constantly monitored for solution strength, impurities, corrosion inhibitors, and the addition of fresh solvent, as there is a constant solvent loss with the treated gas. The by-product of the process is a concentrated acid gas stream that usually cannot be flared. A second system is required to remove the $H_2S$ and convert it to sulfur. This additional step, usually referred to as an SRU, is also a complex system, costing several million dollars and occupying more area on the already limited offshore platform. The SRU also requires continuous and routine operational attention and maintenance.

The system envisioned here would overcome these shortcomings. Seawater scrubbing as presented herein does not require any heaters, there is no make-up solvent or fresh water requirement, the equipment is simple and can be remotely or automatically controlled, creates no acidic gas stream that requires additional treatment, has a minimum of pieces, and low energy requirements.

Non-Patent Publications

A 1964 Article "New K-Data Show Value of Water Wash", published in April 1964 issue of Hydrocarbon Processing and Petroleum Refining, (VOL 43, No. 4) discusses that water can be used to remove a large percentage of $CO_2$ and $H_2S$ in a gas containing high concentration of these components. The paper describes a water washing system at high pressures and with re-circulation of the fresh water solvent. The writers apparently did not envision using a once-through seawater system, the possibility of disposing of the $H_2S$ into the ocean, or the way to recover and reuse the energy.

The 4th Edition of Gas Purification (Gulf Publishing Co., Houston, Tex., ISBN 0-87201-314-6, 1985; 85-4148) pages 265–272 discusses the use of water for removing hydrogen sulfide from gas streams. It expands upon the fact that no heat is required for the acid-gas regeneration, and the possibility of lower operating costs over the conventional amine sweetening processes. The articles describe a larger commercial water wash installation operated in Lacq, France. This process, which, was only operated for a short time, contains many of the features included in the preferred embodiment of our invention, but does not envision the following:

(1) An installation located offshore where seawater can provide the water source and does not need to be regenerated since after absorbing the acid gases it can be returned to the ocean.
(2) The use of an abundant source of water, which allows for more complete gas purification, particularly of $H_2S$.
(3) That the $H_2S$, eventually liberated from the water, requires the installation of a sulfur factory (sulfur removal unit).
(4) Multi-stage scrubbing and recompression of the gases liberated at lower pressures in order to minimize the loss of natural gas.
(5) The use of greater water flow rates into the washing column to produce high purity gas and avoid the requirement of further treatment.

Prior Art Patents

U.S. Pat. No. 6,017,501, is not suitable for processing natural gas, is related specifically to acid gas, and is more complex and expensive than seawater scrubbing.

U.S. Pat. Nos. 4,235,607 and 4,239,510, do not address the recovery of the natural gases dissolved by the seawater. Dissolved hydrocarbon gases are lost to the atmosphere. There are no provisions for recovering the depressurization energy. Since it provides for only one contactor, it does not recover the gas dissolved in the water. It is not a multi-stage contactor process. Mostly the patent does not address how to adjust and control of seawater flow in relation to the gas rate to obtain the desired purification.

U.S. Pat. No. 5,700,311 teaches the removal of $CO_2$ from a multi component gas stream utilizing nucleated water as a "liquid solvent".

U.S. Pat. No. 5,397,553 teaches a system for sequestering $CO_2$ via a clathrate reactor having a seawater feed.

U.S. Pat. No. 5,364,611 to Mitsubishi of Japan teaches a method for fixing $CO_2$ by mixing same with seawater "at a temperature and pressure required for the formation of carbon dioxide hydrate, and dispersing the $CO_2$ hydrate over the deep ocean floor".

U.S. Pat. No. 4,804,523 to Bechtel Group teaches the use of seawater in $SO_2$ absorption of flue gas. See also U.S. Pat. No. 4,085,194 to Hitachi Ltd of Japan for a "Waste Flue Gas Desulfurizing Method" utilizing seawater.

U.S. Pat. No. 5,562,891 to California Inst Tech teaches a method for sequestering $CO_2$ in sea water, where it can be disposed of in the ocean depths.

U.S. Pat. No. 4,603,035 discusses the Stretford process, which contemplates an ammonia solution to isolate hydrogen sulfide.

U.S. Pat. No. 3,970,740 to Exxon Research and Engineering Co contemplates a wet gas scrubbing process utilizing an "aqueous scrubbing mixture maintained within a critical pH range in a jet ejector venturi scrubbing system."

Patents covering $CO_2$ hydrates with nucleated seawater, the formation of $CO_2$ hydrates and $CO_2$ clathrates are entirely unrelated.

U.S. Pat. No. 6,280,505 B1 discusses a method for removing acid gas with seawater. It addresses the conventional systems for absorption. Although the patent includes the use of seawater as a solvent for the removal of acid gases ($CO_2$, NOX, $H_2S$, SOX, etc.) using absorption, it does not employ a counter-current contactor, which can be shown to greatly improve the removal efficiency (less solvent and lower pumping cost), and the recovery of the natural gas components dissolved by the seawater.

GENERAL SUMMARY DISCUSSION OF THE INVENTION

Unlike the prior art, the present invention teaches a system for the removal of acid gases ($CO_2$, $H_2S$, SOX, NOX, etc.) from a multi-component gas stream such as sour natural gas and solvent sweetening acid gas which, is effective in operation, safer, less costly to build and operate, and more environmentally sustainable than prior art systems.

The invention utilizes abundant seawater to sequester the acid gas under a wide range of operating conditions and untreated gas compositions, and provides for their convenient disposal by returning the seawater to the ocean. It can be demonstrated that the sequestered acid gases, specifically $CO_2$ and $H_2S$ rich seawater, can be safely returned to the ocean.

The present method is particularly applicable to offshore installations in the deep ocean. The solubility Of $CO_2$ in deep ocean waters is twice the solubility in surface or near surface seawaters. By disposing of the $CO_2$ with seawater into deep zones, it will remain sequestered for hundreds of years. Cold, deep seawater in higher latitudes sinks to the bottom of the ocean. It circulates to warmer tropical latitudes, where eventually rising, the $CO_2$ escapes into the atmosphere again. The time interval between the water sinking at the high latitudes and rising in the tropics is estimated at 1000 years.

Although the end result, i.e. the quantity of $CO_2$ added to the air, will be the same, the oceans will hold the $CO_2$ long enough to reduce the rapid build-up of $CO_2$ associated with the current use of fossil fuels. It is hoped that in hundreds of years, man will have developed a better supply of energy, or will be forced to conserve the scarce combustible fuel supplies.

The need for an efficient and economic purification system is especially important in the natural gas industry where the percentage of gas produced that requires treatment will increase as uncontaminated reserves of gas are depleted.

In the preferred embodiment of the present invention, a series of counter-current scrubber stages is provided, each configured to remove via absorption/disassociation a portion of the impurities, each stage having less pressure than the predecessor, each stage redirecting recovered gas to the preceding stage where it is recirculated into the system until the contaminant level in the hydrocarbon fluid stream has been reduced to an acceptable level, where is flows from the first stage. Energy recovery means in the form of an energy recovery turbine or the like may also be provided to lessen the energy requirement and increase overall efficiency. Further, the system described herein could be substituted for, or work in conjunction with, a number of other processes.

Therefore it is the object of this invention to provide a method which enables a more economical and efficient, environmentally sound, and safer method for purifying natural gas.

It is another object of the present invention to provide a system for removal of contaminants from a hydrocarbon fluid stream wherein the contaminants are sequestered in seawater for hundreds of years.

It is another object of the present invention to provide a multi-stage contactor system for the salt-water sequestration of contaminants in a hydrocarbon fluid stream, which results in very little loss of the hydrocarbon stream.

It is another object of the present invention to provide a system for purification of natural gas, which is energy efficient, comparatively cost effective to build, operate and maintain, and safe in operation.

It is still another object of the present invention to provide a system for removal of hydrogen sulfide and/or carbon dioxide from a natural gas stream which may be implemented offshore at a lesser cost, increased safety, with decreased environmental impact than prior art systems.

Lastly it is an object to provide a multi-stage contactor system for salt water sequestration of contaminants in a hydrocarbon gas stream, which provides sweet gas in situ.

DESCRIPTION OF THE FIGURES

For a further understanding of the nature and objects of the present invention, reference should be had to the following detailed description, taken in conjunction with the accompanying drawing, in which like parts are given like reference numerals, and wherein:

The FIGURE is a schematic of an embodiment of a multi-stage sour gas sweetening system for practicing the subject invention.

DETAILED DESCRIPTION OF THE INVENTION

The preferred embodiment of the present invention comprises a system for the purification of natural gas, for example, as produced by and pipelined from an offshore platform. In gas production operations, sour natural gas from an HP high pressure gas-liquid) separator or gas producing well will generally need to be purified because hydrogen sulfide and/or carbon dioxide concentrations typically exceed sales specifications for the gas. For an offshore installation of the gas purification system, the concentration of the hydrogen sulfide component of the sour natural gas is preferably at least 0.01 mole % and more preferably about 0.1 and less than 5.0 mole %, and the carbon dioxide component at least 2 mole % and preferably about 3 or 5 mole %. The balance of the feed stream is normally comprised of light paraffin hydrocarbons, primarily methane.

The sour gas stream typically would flow at a rate of 10 MMscfd (11,800 m3/hr) and up to about 100 MMscfd (118,000 m3/hr) at a temperature of between about 100 degrees F. (38 C.) and 140 degrees F. (60 C.) although it is understood by those skilled in the art that the present invention is not limited to the above recited conditions.

The sour natural gas typically would be fed at a pressure of about 1000 psig, but the invention can be applied to sour gas at various pressures, including pressures from about 100 psig to 2000 psig. The preferred, exemplary embodiment of the present invention will describe a process with a sour feed of about 1000 psig.

Continuing with the FIGURE, sour gas 1 feed flows 2 into (for example, the lower portion 18 of) the 1st Stage Scrubber 3 or contactor, where it flows 4 counter current to a stream 5 of seawater 6 pumped 15 from, for example, the ocean into 16 the upper portion 17 of the first scrubber, which is at an exemplary operational pressure of, for example, 1000 psig. The operational configuration of the first Stage Scrubber 3 may consist of a variety of liquid-gas contact apparatus used in the industry including, for example, a multi-stage contact column containing bubble-cap trays, valve trays, sieve trays, or dumped or structured packing, the design and selection of which are familiar to one skilled in the art.

Upon contacting the sea water in the first scrubber under pressure, the acid gases ($H_2S$ and $CO_2$) within the scrubber will be separated or removed from the sour natural gas by a solvent action of the seawater flowing counter-current to, and contacting with, the gas, providing $H_2S/CO_2$ sequestered seawater 7, (which will also contain sequestered natural gas due to the high pressure) which collects in the base or lower portion 18 of the scrubber.

After having been processed through the first stage scrubber at high pressure and in counter current-contact with the sour gas, the seawater collected the bottom of the first Stage Scrubber will approach chemical equilibrium, with the sour gas flowing 2 into the system, thereby providing the sequestered seawater 7. Exemplary operating criteria for the first stage scrubber would be, for example, an operational pressure of about 1000 PSI, although the pressure will vary depending upon the production system operating conditions, as well as wellstream arrival and departing pipeline pressures.

The diameter and height of the 1st Stage Scrubber will depend upon the sour gas flow rate, the seawater flow rate, the operating pressure and temperature and the degree of purification desired.

For example, for a feed gas rate of 10 MMscfd at 1000 psig, the first stage scrubber would be 42 in. diameter by 30 ft. tall, and would contain 20 feet of structured packing. The other scrubbers would be relatively smaller, 12–18 inches diameter by 20–25 ft. tall. A seawater flow of about 550 gpm would be required to produce the desired degree of purification. Additional seawater of 5–10 gpm would be added at the other smaller scrubbers. It is also noted that an alkaline agent such as NH3 49 or the like may be injected 50 into the scrubber, to enhance the sulfide sequestration efficiency of the seawater.

The sequestered seawater 7 flows 8 from the first Stage Scrubber 3, and passes through a control valve 9 that reduces the pressure to about 450 psig (31.67 kg/cm2) before entering the 2nd Stage Scrubber. An energy recovery turbine 22 (which may be coupled with a balancing motor) may be utilized at this point to recover some of the energy expended due to the significant pressure reduction to aid in pumping seawater at the higher operating pressure of the scrubber, as will be discussed further.

The sequestered seawater 7, after passing through the control valve 9, passes 10 into the second stage scrubber 11. The reduction in the pressure from the first stage (1000 psig) to the second stage scrubber 11(450 psig) causes the sequestered water 7 to release a large quantity of natural gas with some $H_2S$ and $CO_2$, which flashes into the bottom of the 2nd Stage Scrubber.

The mixture of these gases 14 is washed in the 2nd Stage Scrubber by additional seawater 20 supplied in a counter-current flow 12 scrubbing out acid gases so as to purify the natural gas released at the lower pressure, providing $H_2S/CO_2$ sequestered seawater 19 (which may still contain some entrained natural gas therein, although less natural gas than was entrained in the first stage) collecting in the base or lower portion 24 of the second scrubber, until sufficient level is obtained to open the dump valve, where it is diverted to a third scrubber 21. The gas 14 not absorbed by the seawater may further be passed through a mist eliminator contained in the scrubber, to remove entrained water.

The flow rates of the seawater to the 1st Stage Scrubber, the 2nd Stage Scrubber and 3rd Stage Scrubber are adjusted to obtain the desired purity of the gases leaving the scrubbers. On-line gas analyzers such as lead acetate tape, photometric, and gas chromatograph analyzers can be employed to analyze the gas for $H_2S$ and/or $CO_2$ or the impurity to be removed. The on-line analyzer can be used to automatically control the flow of seawater to the scrubbers to control the purity of the treated gas.

Gas washed in the 2nd Stage Scrubber, passing 13 from the 2nd stage scrubber at about 450 psig, after (ideally) being passed through a mist eliminator to remove entrained seawater, is compressed by 2nd Stage Compressor 23 to about the pressure of the first scrubber, in this exemplary case, 1000 psig. The moisture retrieved from the mist eliminator, if one is used, may be drained to the seawater 20 passing to the second scrubber. The compressor for the gas leaving the scrubber (in the present scenario) will not require construction of expensive alloys and/or NACE certified materials, because the concentration of the corrosive $H_2S$ will be very low.

The gas leaving the compressor will be hot, due to the heat of compression, and will be cooled by passing 25 it through the upper portion of the 1st Stage Scrubber. The hot gas can thereby be cooled by heat exchange with relatively cooler seawater 6 by direct contact with seawater in the top portion of scrubber. This gas is of sufficient purity to meet sales specification, and is thus vented 26 from the first scrubber, so as to provide providing sweet gas.

If the gas leaving 26 from the first scrubber does not meet the sales specification for natural gas, usually 4 ppmv (maximum), it can be polished with a chemical scavenger. This technology is well known by those skilled in the art of treating small quantities of $H_2S$ in natural gas.

The sequestered seawater 19 collected the bottom of the 2nd Stage Scrubber 11 is at a lower pressure than the first stage, and therefore contains less dissolved natural gas components. The sequestered seawater 19 is drained 27 from the second scrubber, and passes through control valve 28, where it undergoes a second reduction in pressure, in the present example, to a pressure of about 150 psig (10.55 kg/cm$_2$) the energy of which can also be recovered in a energy recovery turbine 29 to drive the seawater pump as in the first stage discussion, above.

Once again, the reduction in pressure causes the water and dissolved gases, which flash upon passing 30 into the bottom of the 3rd Stage Scrubber 21. Once again more natural gas components are released from solution, along with small amounts of $H_2S$ and $CO_2$. The released gas 33 is scrubbed in the 3rd Stage Scrubber by additional seawater added at the top of the scrubber, and flowing 34 counter current through the scrubber packing or trays.

The seawater 31 flow, which again may be controlled by an on-line analyzer, acts as a solvent to remove the desired quantity of $H_2S$ and $CO_2$, resulting in sweet natural gas. The sweet gas flowing 35 from the 3rd Stage Scrubber is compressed in the first Stage Compressor 36 to about 450 psig (31.67 kg/cm2) and introduced 37 to the top of the 2nd Stage Scrubber 11 where it is cooled by heat exchange with the seawater 20 flow. Again, because the gas flowing from the third stage is sweet because the $H_2S$ component has been essentially removed, the first stage compressor 36 will not require expensive special materials of construction, as with the second stage compressor.

The third stage sequestered seawater 38, having picked up the acid gas impurities from the 1st Stage, 2nd Stage and 3rd Stage Scrubbers flows 39 from the third stage scrubber and undergoes a reduction in pressure to about 50 psig (31.67 kg/cm2) in control valve 40 and the reduction in pressure releases more dissolved gases as it flows 41 into the bottom of the 4th Stage Scrubber 42, where any gases 43 released by the drop in pressure are scrubbed by seawater 44 flowing 45 counter currently through a multi-stage contact tower, which brings the gas and seawater into equilibrium by way of intimate contact.

The seawater again removes the acid gas impurities from the natural gas stream, leaving the sweet natural gas components at the scrubber overhead 46. At this point, the flow rate of this sweet gas stream can be recovered in another compressor, used for fuel gas, or if the quantity is too small to recover economically, it can be flared. The seawater 47 collected on the bottom of the 4th Stage Scrubber is drained 48 or pumped from the scrubber sea, preferably over 100 feet and ideally over 1000 feet deep, where the $H_2S$ or $CO_2$ will remain sequestered for hundreds of years.

The seawater scrubbing system is characterized by the recovery of the energy of the released pressure of the liquids containing gases in solution and a working temperature in the region of ambient temperatures.

The use of a counter-current multistage contactor provides the highly efficient means of purification, in that it maximizes the degree of acid gas removal for the minimum flow of the solvent, e.g. seawater. The selection of the column internals depends on gas and seawater flow rates, pressures, turndown ratio desired, the stability of the offshore platform among other considerations. The 2nd, 3rd and 4th Stage Scrubber will be of similar design, although the diameter and height can be considerably different than the 1st Stage Scrubber.

The role of the energy recovery turbines can be an important component to the present system, not only from an energy recovery viewpoint, but also as a regulator of the temperature of absorption. Without the turbines, the release in pressure is accompanied by a rise in temperature, which is not negligible and could require that the system include seawater coolers. The temperature of the water has a significant effect on the efficiency of the washing process. Higher temperatures reduce the solubility of the acid gases.

For higher concentration of acid gas in a natural hydrocarbon gas stream, which can occur on an offshore platform, the desulfurization may need to be carried out in two steps. The first step is the seawater scrubbing system described herein, which removes the bulk of the acid gas impurities. In some cases it may not be feasible to remove the acid gas impurities to the degree desired. A second process step for the desulfurization can be selected from a large array of technologies. The second step desulfurization can be chemical scavenging agents, amine sweetening, physical solvent absorption with regeneration, solid bed absorption, molecular sieves, etc.

Utilizing the published equilibrium K-valves (see below):

$$K_{CH4} = \frac{306,000}{p} + 2.19t + \frac{3910t}{P} - 145.0AG - 121.6R$$

$$K_{CO2} = \frac{3500}{P} + 0.12t + \frac{360.0t}{P} + 8.30AG - \frac{5825R}{P}$$

$$K_{H2S} = 4.53 - \frac{1087}{P} + \frac{110.0t}{P} + 4.65AG$$

the concentration of the acid gas components, hydrogen sulfide and carbon dioxide in the seawater can be calculated.

Once the concentration of these components in the seawater is known, one can calculate the approximate flow of seawater required to remove the acid gas components. The design calculation is best performed with the use of a process simulation computer program.

The concentration of the acid gas components in the seawater is a function of the mole % of the components in the gas, the pressure in the scrubber and the temperature. For the same gas composition, the higher the pressure, the greater the concentration of acid gas in the seawater.

Using seawater scrubbing to remove the bulk of the acid gas has the benefit of low energy consumption, no heat requirements, no chemical costs and the sulfide impurities do not need to be recovered to avoid discharging of sulfurous oxides into the atmosphere, thus avoiding the capital and operating cost of a complex sulfur recovery unit.

It is strongly iterated that the above exemplary system is not intended to be limiting of the scope of the invention with regard to the number of stages, types of contactors, or specifications as to the range of operations. The number of scrubbers required will be dictated by the quality of the gas, types and concentration of impurities, pressure and flow characteristics of the gas, temperature of the gas, quality/temperature of the seawater, environmental regulations, space allocated for the footprint of the system, supplemental processing apparatus, etc. Further, the use of energy recovery turbines is desirable but is not an absolute necessity. Under some circumstances a single scrubber may be all that is required, others may require two, three, four, or perhaps more in the series arrangement discussed above.

Further, it is noted that the term "sea water" is utilized as a term to describe water from a large body of water, and is not intended to be limited as to water coming specifically from a body of water termed a "sea".

It is also reiterated that the operational concepts of the present invention, exemplified above, are not only suitable for separating $CO_2$ and $H_2S$ from a gas stream, but is also effective for removal of other components including SOX, NOX, etc. from a multi-component gas stream such as sour natural gas, as well as other gas streams, including flue gas. Accordingly, the above exemplary embodiment of the invention is not to be considered limiting as to the type of component being removed or the gas stream, which is to be processed. The invention embodiments herein described are therefore done so in detail for exemplary purposes only, and may be subject to many different variations in design, structure, application, and operation methodology. Thus, the detailed disclosures therein should be interpreted in an illustrative, exemplary manner, and not in a limited sense.

What is claimed is:

1. The method of removal and isolation of impurities in a gas stream, comprising the steps of:
   a.) flowing said gas stream though a first stage scrubber having an operating pressure, such that said gas stream undergoes counter-current contact with sea water, sequestering a portion of said impurities and a portion of said gas stream in said sea water, so as to provide first stage sequestered sea water, and a purified gas stream;
   b.) flowing said first stage sequestered sea water through a second stage scrubber having a lesser operating pressure than said first stage scrubber, providing a second stage pressure differential;
   c.) utilizing said second stage pressure differential to flash impurities and gas sequestered from said first stage sequestered sea water, providing a second stage gas stream;
   d.) flowing said second stage gas stream though said second stage scrubber, such that said second stage gas stream undergoes counter-current contact with sea water, sequestering a portion of said impurities and a portion of said gas stream in said sea water, so as to provide second stage sequestered sea water, and a second stage purified gas stream.

2. The method of claim 1, wherein after step "d. there is provided the additional steps of:
   e.) compressing said second stage purified gas, producing heated, compressed gas having a pressure about that of said first stage scrubber;
   f.) directing said heated, compressed gas into said first stage scrubber, and
   g.) cooling said heated, compressed gas in said first stage scrubber via heat exchange with said seawater therein.

3. The method of claim 2, wherein after step "g" there is provided the additional steps of:
   h.) flowing said second stage sequestered sea water through a third stage scrubber having a lesser operating pressure than said second stage scrubber, providing a third stage pressure differential;
   I.) utilizing said third stage pressure differential to flash impurities and gas sequestered from said second stage sequestered sea water, providing a third stage gas stream;
   j.) flowing said third stage gas stream though said third stage scrubber, such that said third stage gas stream undergoes counter-current contact with sea water, sequestering a portion of said impurities and a portion of said gas stream in said sea water, so as to provide third stage sequestered sea water, and a third stage purified gas stream.

4. The method of claim 3, wherein there is provided after step "j." the additional steps of
   k.) compressing said third stage purified gas stream, producing heated, compressed gas having a pressure about that of said second stage scrubber
   l.) re-introducing said heated compressed gas into said second stage scrubber; and
   m.) cooling said heated, compressed gas in said first stage scrubber via heat exchange with said seawater therein.

5. The method of claim 4, wherein after step "m" there is provided the additional steps of:
   n.) flowing said third stage of sequestered sea water through a fourth stage scrubber having a lesser operating pressure than said second stage scrubber, providing a fourth stage pressure differential;
   o.) utilizing said fourth stage pressure differential to flash impurities and gas sequestered from said third stage sequestered sea water, providing a fourth stage gas stream;
   p.) flowing said fourth stage gas stream though said fourth stage scrubber, such that said fourth stage gas stream undergoes counter-current contact with sea water, sequestering a portion of said impurities and a portion of said gas stream in said sea water, so as to provide fourth stage sequestered sea water, and a fourth stage purified gas stream.

6. The method of claim 1, wherein there is provided after step "d." the additional steps of:
   d1. placing a first control valve situated between said first stage scrubber and said second stage scrubber so as to allow the passage of said first stage sequestered sea water from said first stage scrubber therethrough so as to facilitate a. drop in pressure of said first stage sequestered seawater flowing to said second stage scrubber, so as to provide said first stage pressure differential;

d2. utilizing a first energy recovery turbine to extract energy from first stage pressure differential; providing first stage extracted energy;

d3. utilizing said first stage extracted energy to power a pump for pumping seawater into said second stage scrubber.

7. The method of claim 3, wherein there is provided after step "p" the additional steps of:

p1. placing a second control valve situated between said second stage scrubber and said third stage scrubber so as to allow the passage of said second stage sequestered sea water from said second stage scrubber therethrough, so as to facilitate a drop in pressure of said second stage sequestered sea water flowing to said third stage scrubber, so as to provide a second stage pressure differential;

p2. utilizing a second energy recovery turbine to extract energy from said second stage pressure differential; providing second stage extracted energy;

p3. utilizing said second stage extracted energy to power a pump for pumping seawater into said second stage scrubber.

8. The method of claim 2, wherein after step "g." there is provided the further step "g1." of pumping said second stage sequestered sea water to a depth of at least 100 feet in a body of water.

9. The method of removing a contaminant from natural gas, comprising the steps of:

a.) flowing said natural gas though a first stage scrubber having an operating pressure above atmospheric pressure;

b) subjecting said natural gas to counter-current contact with a flow of seawater;

c) sequestering said contaminant and a portion of said natural gas in said seawater, so as to provide first stage sequestered seawater;

d.) flowing said first stage sequestered sea water through a second stage scrubber having a lesser operating pressure than said first stage scrubber, providing a second stage pressure differential;

e.) utilizing said second stage pressure differential to flash natural gas from said first stage sequestered seawater, providing a second stage gas stream;

f.) flowing said second stage gas stream though said second stage scrubber, such that said second stage gas stream undergoes counter-current contact with sea water, sequestering said contaminant in said second stage gas stream in said sea water, so as to provide second stage sequestered sea water, and a second stage purified gas stream.

10. The method of claim 9, wherein after step "f." there is provided the additional steps of:

g.) compressing said second stage purified gas producing heated, compressed gas having a pressure about that of said first stage scrubber;

h.) directing said heated, compressed gas into said first stage scrubber, and i.) cooling said heated, compressed gas in said first stage scrubber via heat exchange with said seawater therein.

11. The method of removing a contaminant from natural gas, comprising the steps of:

a.) sequestering a portion of said natural gas and said contaminant into $H_2O$, providing sequestered liquid;

b.) subjecting said sequestered liquid to a reduced atmospheric pressure to facilitate the migration of said natural gas from said $H_2O$, while retaining a portion of said contaminant in said $H_2O$, so as to provide purified natural gas and contaminant infused $H_2O$;

c.) collecting said purified gas, d.) repeating steps a through c, until said natural gas is processed to the desired purity.

12. The method of removing a contaminant from a gas stream, comprising the steps of:

a.) sequestering a portion of said gas stream and said contaminant into a liquid;

b.) subjecting said liquid to a reduced atmospheric pressure to facilitate the migration of said gas stream from said liquid, while retaining a portion of said contaminant in said liquid, so as to provide a purified gas stream;

c.) collecting said purified gas stream, and d.) repeating steps a through c, until said gas stream is processed to the desired purity.

13. The method of claim 12, wherein said gas stream comprises exhaust gas.

14. The method of claim 13, wherein said exhaust gas comprises flue gas.

15. The method of claim 14, wherein said contaminant comprises $H_2S$.

16. The method of claim 15, wherein said contaminant comprises $CO_2$.

17. The method of claim 12, wherein said gas stream comprises hydrocarbon gas.

18. The method of claim 17, wherein said gas stream comprises natural gas.

19. The method of claim 18, wherein said contaminant comprises $H_2S$.

20. The method of claim 19, wherein said contaminant comprises $CO_2$.

21. The method of claim 20, wherein said liquid comprises seawater.

22. The method of claim 21, wherein after step "d." there further comprises the additional step "e." of pumping said liquid and contaminant into a body of water to a depth of over 100 feet.

* * * * *

UNITED STATES PATENT AND TRADEMARK OFFICE
CERTIFICATE OF CORRECTION

PATENT NO.   : 6,881,389 B2
DATED        : April 19, 2005
INVENTOR(S)  : Paulsen et al.

It is certified that error appears in the above-identified patent and that said Letters Patent is hereby corrected as shown below:

<u>Title page,</u>
Item [75], Inventors, change "Wayne C. Page" to -- Wayne P. Page --;

<u>Column 8,</u>
Line 56, change "K-valves" to -- K-values --.

Signed and Sealed this

Twelfth Day of July, 2005

JON W. DUDAS
*Director of the United States Patent and Trademark Office*